United States Patent [19]

Andrä et al.

[11] Patent Number: 4,914,949
[45] Date of Patent: Apr. 10, 1990

[54] TORSIONAL VIBRATION DAMPER

[75] Inventors: Rainer Andrä, Limburg; Günter Ullrich, Hemsbach; Werner Bauer, Weinheim; Friedrich Reinhold, Heddesheim; Georg Schäfer, Weinheim, all of Fed. Rep. of Germany

[73] Assignee: Firma Carl Freudenberg, Weinheim, Fed. Rep. of Germany

[21] Appl. No.: 266,229

[22] Filed: Oct. 28, 1988

Related U.S. Application Data

[63] Continuation of Ser. No. 55,602, May 29, 1987, abandoned.

[30] Foreign Application Priority Data

Oct. 1, 1986 [DE] Fed. Rep. of Germany ....... 3633414
Nov. 8, 1986 [DE] Fed. Rep. of Germany ......... 363820

[51] Int. Cl.$^4$ ............................................. F16F 15/10
[52] U.S. Cl. ........................................ 74/574; 464/87; 464/89; 74/572
[58] Field of Search ................. 74/572, 573 R, 573 F, 74/574; 464/89, 87, 90

[56] References Cited

U.S. PATENT DOCUMENTS

| | | | |
|---|---|---|---|
| 3,280,654 | 10/1966 | Arnt | 74/574 |
| 3,323,326 | 6/1967 | Vertson | 74/574 |
| 3,440,899 | 4/1969 | McGavern et al. | 74/574 |
| 3,495,459 | 2/1970 | McLean | 74/574 |
| 3,678,708 | 7/1972 | Ernst et al. | 74/574 |
| 3,749,372 | 7/1973 | Funck | 74/574 |
| 4,033,642 | 7/1977 | Sorgatz et al. | 74/574 |
| 4,380,442 | 4/1983 | Amsel | 464/87 X |
| 4,516,955 | 5/1985 | Worner et al. | 464/89 |
| 4,764,152 | 8/1988 | Jorg et al. | 464/87 X |

FOREIGN PATENT DOCUMENTS

| | | | |
|---|---|---|---|
| 2311985 | 9/1974 | Fed. Rep. of Germany | 464/89 |
| 2831076 | 1/1980 | Fed. Rep. of Germany | 74/574 |
| 3535803 | 9/1986 | Fed. Rep. of Germany | 74/574 |
| 631528 | 8/1982 | Switzerland | 74/574 |
| 1597760 | 9/1981 | United Kingdom | 74/573 F |

OTHER PUBLICATIONS

Rules of Practice, Jan. 1970, 37CRF, p. 139, Symbols for Draftsmen.

Primary Examiner—Vinh Luong
Attorney, Agent, or Firm—Felfe & Lynch

[57] ABSTRACT

A torsional vibration damper in which the hub ring and the flyring are interconnected through vulcanized-in basic resilient elements as well as resilient units made of rubber that are uniformly distributed around the circumference. These consist of columnar first and second resilient elements which at their outer surfaces merge into one another and at their inner surfaces are spaced from one another. The second resilient elements are precompressed by the first resilient elements and, when the torsional vibration damper is not rotating, are spaced at their outer surfaces from the inner surface of the flyring. At a desired speed of rotation, they are caused by centrifugal force to bear immovably on the inner surface of the flyring. This mechanical connection places their spring action in parallel with the spring action of the basic resilient elements.

6 Claims, 1 Drawing Sheet

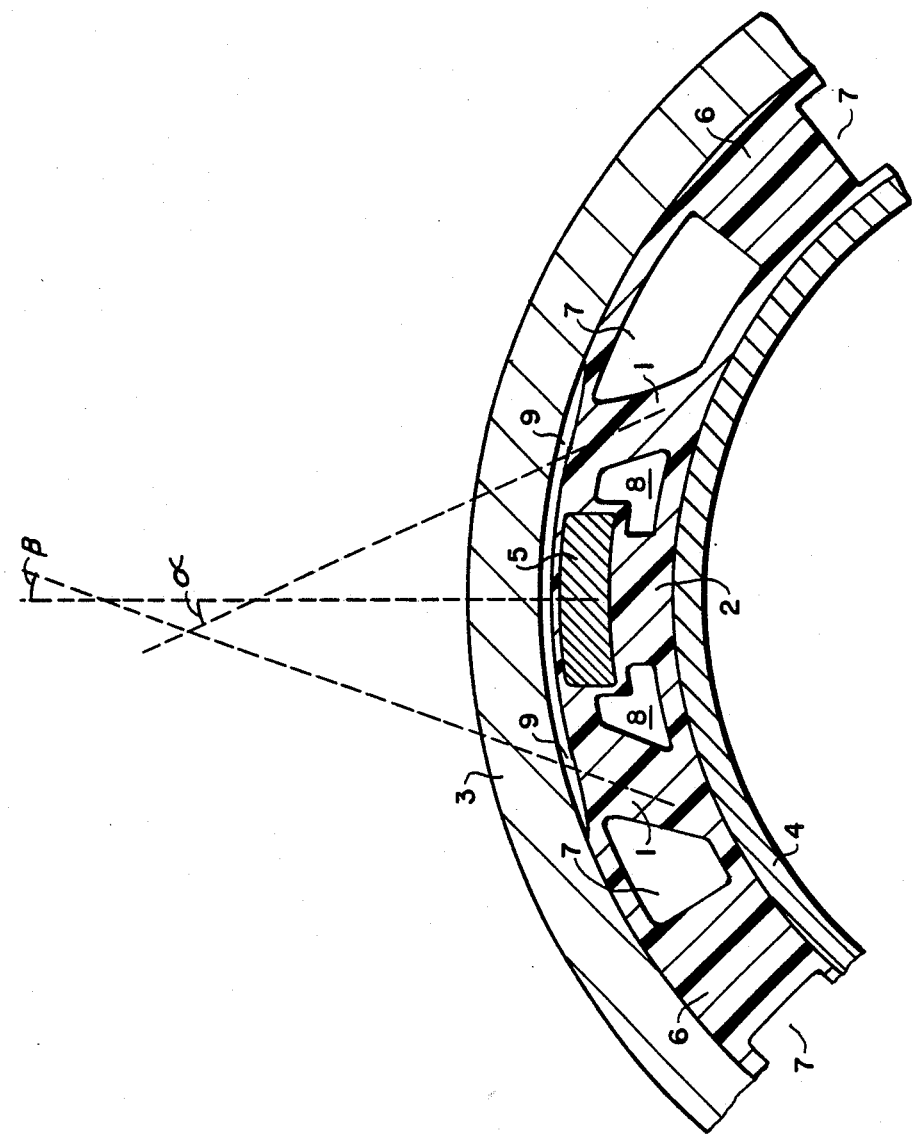

4,914,949

TORSIONAL VIBRATION DAMPER

This application is a continuation of application Ser. No. 055,602, filed May 29, 1987 now abandoned.

BACKGROUND OF THE INVENTION

The invention relates to a torsional vibration damper comprising a hub ring and a flyring which are capable of angular displacement relative to each other. The hub ring and flyring are connected together by basic resilient elements that are uniformly distributed around the circumference as well as by first and second resilient elements which are vulcanized to the hub ring, parallel to the basic resilient elements, and which are spaced at their outer surfaces from the inner surface of the flyring when the device is not rotating. These first and second resilient elements are adapted to be caused by the centrifugal force, generated at the desired rotational speed, to bear immovably against the flyring.

A torsional vibration damper of this type is known from German patent No. 3,535,803 issued on Sept. 11, 1986. The wear sustained by the opposed circumferential surfaces of the second resilient elements and the flyring, respectively, even after short-term use, is less than satisfactory.

SUMMARY OF THE INVENTION

The principal objective of the present invention is to provide a torsional vibration damper in which the wear of the opposed circumferential surfaces of the second resilient elements and of the flyring is greatly reduced in operation so that the service life of the device is lengthened.

This objective is achieved, in accordance with the invention, with a torsional vibration damper of the type described above wherein (1) the first and second resilient elements are given a columnar shape; (2) at least one first resilient element is associated with each second resilient element on both sides thereof in the peripheral direction; and (3) the first and second resilient elements of every resilient unit so formed are circumferentially spaced from one another at their inner surfaces.

The first and second resilient elements merge into one another at their outer circumferences, and thus are formed or vulcanized together. Since the first resilient elements are associated with the radially extending second resilient elements in an inclined manner, their absolute lengths differ. During the cooling that follows vulcanization, this difference in length leads to tensile stresses in the first resilient elements and to compressive stresses in the second resilient elements. The spacing of the outer surfaces of the first and second resilient elements from the inner surface of the flyring is therefore maintained until a high rotational speed is reached, thus precluding any wear during starting. Nevertheless, good damping action is obtained, which is largely due to the springy resilience of the basic resilient elements and of the mass of the flyring.

When still higher speeds of rotation are reached, the first and second resilient elements bear with their outer surfaces immovably against the inner surface of the flyring and thus are placed mechanically in parallel with the basic resilient elements. The damping action so obtained is a function of resiliency of all the resilient elements combined and of the mass of the flyring. It thus readily meets the requirements imposed by high speeds of rotation.

Especially in automotive applications, the torsional vibration damper of the invention exhibits greatly reduced wear of the opposed circumferential surfaces of the first and second resilient elements and of the flyring, respectively, which are in contact with one another only at high rotational speeds. It is thought that this reduced wear is attributable mainly to the fact that, with increasing rotational speeds, internal-combustion engines develop very high available power, permitting critical speed ranges to be rapidly traversed. The duration of frictional contact between the outer surfaces of the second resilient elements and the inner surface of the flyring is therefore limited to a minimum.

The total cross-sectional areas of the first resilient elements of each resilient unit and the total individual cross-sectional area of the associated second resilient element in such unit are advantageously made substantially equal. The specific cross-sectional loads are then largely balanced, which makes for economical material usage.

Also advantageously, the first and second resilient elements merge into one another in a transition zone whose cross-sectional area substantially corresponds to the cross-sectional area of the first resilient elements. The forces generated by the shrinkage of the first resilient elements are then transmitted particularly well to the second resilient elements. This is very important so far as the functioning of the torsional vibration damper of the invention is concerned.

The circumferential spacing of the first and second resilient elements of each resilient unit is advantageously such that the imaginary extensions of the respective axes intersect at an angle of between 25 and 65 degrees. This permits the wear in sustained operation to be reduced to a minimum. In accordance with a further embodiment, the angles obtained on the two sides of each resilient unit have differing values.

Such a design is especially advantageous when the torsional vibration damper of the invention is used in the drive train of an motor vehicle. It results in spring characteristics, and thus in different damping characteristics, that are dependent upon the direction of rotation of the associated shaft. Such characteristics are frequently desirable in applications that pose problems.

For a full understanding of the present invention reference should now be made to the following detailed description of the preferred embodiment of the invention and to the accompanying drawing.

BRIEF DESCRIPTION OF THE DRAWING

The single FIG. is an elevational, cross-sectional view of a section of the torsional vibration damper according to the preferred embodiment of the present invention.

DESCRIPTION OF THE PREFERRED EMBODIMENT

The torsional vibration damper shown in the single Figure comprises a flyring 3 and a hub ring 4 which are connected together by basic element 6 and intermediate resilient units that are uniformly distributed around the circumference. Openings 7 are provided between the basic elements 6 and these intermediate resilient units. The intermediate resilient units are all of the same design, each including in the center a radially extending second resilient element 2, which is statically secured in position only on its inner surface to the hub ring 4. The second resilient element 2 is flanked on both sides in the circumferential direction by two first resilient elements 1, these being oppositely inclined in the circumferential direction. These first and second resilient elements are integrally joined together at their outer extremities; at their inner extremities the first and second resilient elements are circumferentially spaced providing openings 8. The absolute length in the direction in which the first resilient elements extend is greater than that of the associated second resilient element 2. The absolute value of the shrinkage following vulcanization is therefore greater for the first resilient elements 1 than for the second resilient element 2. This results in a latent static precompression in the second resilient element 2.

The radial spacing 9 between the outer face of the second resilient element 2 and the inner surface of the flyring 3, as shown in the single Figure, therefore remains nearly unchanged up to very high speeds of rotation. This spacing largely precludes fictional wear during starting.

At still higher speeds, the precompression is overcome by centrifugal force, and the first and second resilient elements 1 and 2 bear with their outer surfaces on the inner surface of the flyring 3. They are therefore placed mechanically in parallel with the basic resilient elements 6, with their springiness being effective in the circumferential direction. The damping characteristics of the torsional vibration damper are thus radically changed.

An auxiliary mass 5, which may consist of steel, for example, may be vulcanized into the second resilient element 2 near its outer surface. Its use is conducive to rigid coupling of the outer surface of the second resilient element to the inner surface of the flyring 3 at high rotational speeds. In addition, a similar auxiliary mass may be used for the secure placement of an outwardly directed brake lining on the second resilient element 2. However, its use may be dispensed with in many cases and is not a central feature of the present invention.

As shown in the Figure, the first and second resilient elements 1 and of each resilient unit are spaced such that their respective axes intersect at angles $\alpha$ and $\beta$ respectively, of between 25 and 65 degrees. This reduces the wear in sustained operation to a minimum. Advantageously, angles $\alpha$ and $\beta$ may have different values.

There has thus been shown and described a torsional vibration damper which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the claims which follow.

What is claimed is:

1. In a torsional vibration damper comprising a hub ring and a flyring which are interconnected through basic resilient elements that are uniformly distributed around the circumference and are capable of angular displacement relative to each other, and further comprising first resilient elements and second resilient elements which are fastened to the hub ring mechanically in parallel with the basic resilient elements and which are spaced at their outer surfaces from the inner surface of the flyring by an air gap when the device is not rotating and are adapted to be cause by the centrifugal force generated at a desired rotational speed to bear immovably against the flyring, the first and second resilient elements being integrally joined together at their outer extremities to form a unit and consisting of vulcanized-in rubber bodies, the improvement wherein the first and second resilient elements are columnar in shape; wherein at least one first resilient element is associated with each second resilient element on both sides thereof in the circumferential direction; and wherein the first and second resilient elements of every resilient unit so formed are circumferentially spaced from one another at their inner extremities.

2. A torsional vibration damper according to claim 1, wherein the total cross-sectional area of the first resilient elements of each resilient unit and the cross-sectional area of the associated second resilient element are substantially equal.

3. A torsional vibration damper according to claim 1, wherein the first and second resilient elements are joined together in a region whose cross-sectional area is substantially equal to the sum of the cross-sectional areas of the first and second resilient elements.

4. A torsional vibration damper according to claim 1, wherein the circumferential spacing of the first and second resilient elements of each resilient unit is such that the imaginary extensions of their respective axes intersect at an angle of from 25 to 65 degrees.

5. A torsional vibration damper according to claim 4, wherein the angles obtained on the two sides of each resilient unit have differing values.

6. A torsional vibration damper according to claim 1, wherein an auxiliary mass is incorporated into the second resilient element.

* * * * *